Figure 1:
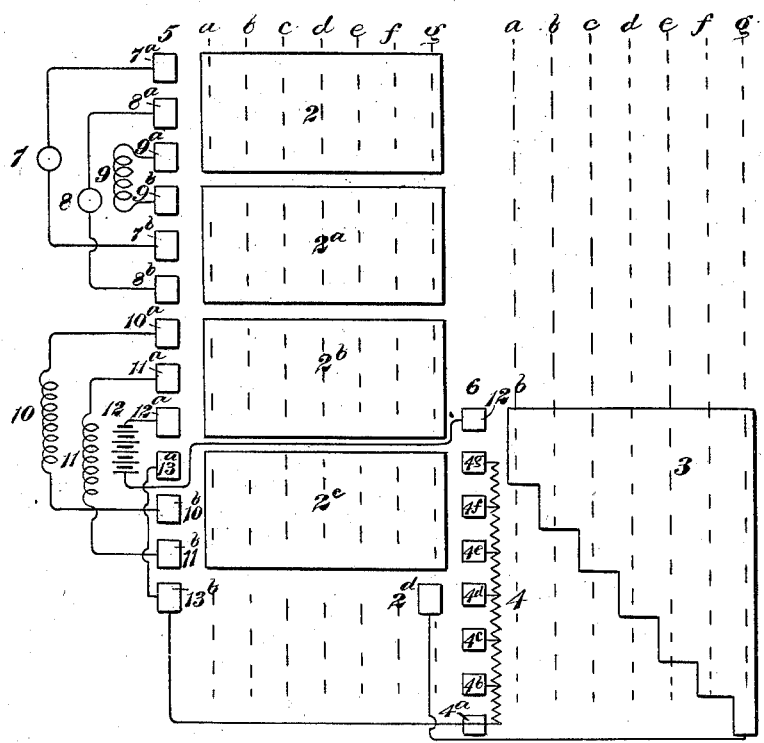

No. 731,455. PATENTED JUNE 23, 1903.
E. R. HILL.
ELECTRIC BRAKE.
APPLICATION FILED DEC. 29, 1899.
NO MODEL.

WITNESSES:
Ethan D. Dodds
James B. Young

INVENTOR
Ernest R. Hill
BY
Wesley G. Carr
ATTORNEY.

No. 731,455.

Patented June 23, 1903.

UNITED STATES PATENT OFFICE.

ERNEST R. HILL, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC BRAKE.

SPECIFICATION forming part of Letters Patent No. 731,455, dated June 23, 1903.

Application filed December 29, 1899. Serial No. 741,968. (No model.)

*To all whom it may concern:*

Be it known that I, ERNEST R. HILL, a citizen of the United States, residing at Wilkinsburg, in the county of Allegheny and State of Pennsylvania, have invented a new and useful Improvement in Electric Brakes, of which the following is a specification.

My invention relates to means for braking electrically-propelled vehicles, and particularly to such means as utilize the propelling-motors to generate current for energizing the magnets of brake-shoes when the current supplied to the motors is cut off and their armatures are propelled by the momentum of the vehicle acquired during the time when the machines were operating as motors or by the momentum due to the grade of the track.

In the operation of electric or electromagnetic brakes as heretofore generally practiced the field-magnet and armature windings of the motors are connected in a closed circuit with a considerable amount of external resistance when the main-line current is cut off, so that the motors then act as series-wound generators to supply energy to the brake-magnets. In the use of the motors in this manner since all of the current generated must pass through the field-magnet windings these windings become heated to a high temperature. The magnetic density of the armature-cores is also raised to a high point by reason of the large current in the field-magnet coils, and the resulting iron losses cause a high armature temperature. Furthermore, the large amount of external resistance necessarily included in the circuit at the beginning of the braking operation is such that the brakes do not act as quickly as is sometimes desired, since the energizing-current for the brake-magnets is cut down to a very small amount by such resistance. In order to obviate these objectionable features, I propose to connect the field-magnets and armatures of the motors in separate circuits for braking purposes and to energize the field-magnets by current from a separate source of current, preferably a battery of the secondary type. With my proposed arrangement there need be and preferably will be no external resistance in the armature-circuits, the variable resistance or other means for varying the field-magnet excitation, and consequently the braking effect, being all included in the field-magnet circuits.

A further advantage incident to my invention resides in the fact that an independent source of current for the field-magnets insures a certain amount of braking action under conditions that would preclude such action if the energizing-current were derived from the armatures.

Figure 2:
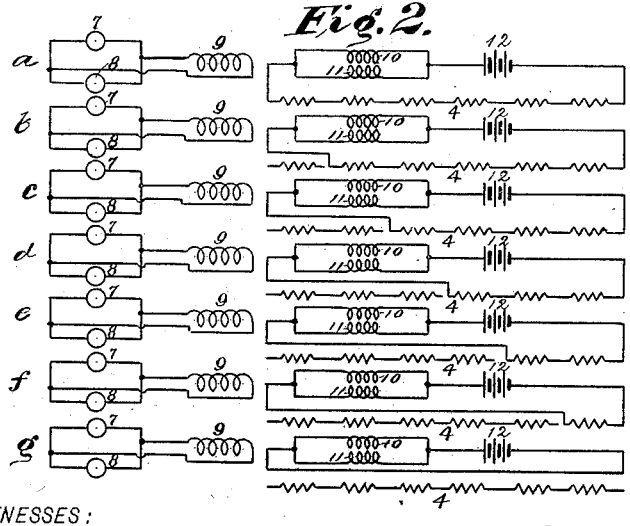

In the accompanying drawings, Figure 1 is a diagrammatic development of a braking-controller and the several parts of the apparatus connected therewith. Fig. 2 is a diagram showing the different braking positions.

The drum 1 (represented diagrammatically in Fig. 1) may be directly connected to a power-controller or mounted on some part of such controller or geared thereto, as may be found desirable, no part of the power-controller being, however, shown in the drawings. The drum 1 is provided on approximately one half of its periphery with a set of four contact-plates 2, $2^a$, $2^b$, and $2^c$, and on the other half of its periphery with a single contact-plate 3, having a series of steps corresponding to the different sections of the resistance 4, employed in braking. A set of stationary contact-fingers 5 is located at one side to make contact with the strips or plates 2, and another set of contact-fingers 6 is located at the other side in such position that two or more of the set will engage with the plate 3 at the same time that the fingers 5 are in contact with the plates 2. The armature 7 of one of the motors is shown as having its terminals respectively connected to the fingers $7^a$ and $7^b$ and the armature 8 as having its terminals respectively connected to the fingers $8^a$ and $8^b$. The brake-magnet coil 9 has its terminals connected to the fingers $9^a$ and $9^b$. The field-magnet winding 10 of one motor has its terminals respectively connected to the fingers $10^a$ and $10^b$, and the other field-magnet winding 11 has its terminals respectively connected to the fingers $11^a$ and $11^b$. The battery 12 for energizing the field-magnets 10 and 11 has one terminal connected to the finger $12^a$ of the set 5 and its other terminal to the finger $12^b$ of the set 6. Fingers $13^a$ and $13^b$ are electrically connected together, and the latter is connected to one terminal of the resistance 4 and also to the contact-finger $4^a$ of the set 6. The drum 1 is also provided with a small final contact-plate $2^d$ for the finger $13^b$, this plate being electrically connected to the plate 3, as indicated.

When the drum is rotated to bring it into its first braking position with reference to the sets of fingers 5 and 6, this position being designated as $a$, the armatures 7 and 8 will be connected in parallel to the terminals of the brake-magnet coil 9 by means of fingers $7^a$ and $8^a$, plate 2, finger $9^a$, finger $9^b$, plate $2^a$, and fingers $7^b$ and $8^b$. The field-magnet windings 10 and 11 will be connected in a separate closed circuit including the battery 12 and the entire resistance 4, the circuit being from one terminal of the battery to finger $12^a$, plate $2^b$, fingers $10^a$ and $11^a$, field-magnet windings 10 and 11, fingers $10^b$ and $11^b$, plate $2^c$, fingers $13^a$, finger $13^b$, the resistance 4, finger $4^g$, plate 3, and finger $12^b$, and back to the other terminal of the battery. For the next braking position $b$ the circuits will be the same as for the position $a$, except that finger $4^f$ of the set 6 will be in engagement with plate 3, and consequently one section of the resistance 4 will be short-circuited. The succeeding positions will provide the same circuits and will differ only in that each of the fingers $4^e$, $4^d$, $4^c$, $4^b$, and $4^a$ will be successively brought into contact with the plate 3, and consequently the resistance 4 will be short-circuited section by section until position $g$ is reached, when the resistance will be all short-circuited and the maximum braking effect secured.

I do not limit my invention to any specific form of controller or to any specific arrangement of the apparatus and circuits except in so far as limitations are imposed by the prior art and are expressly set forth in the claims.

I claim as my invention—

1. Means for braking an electrically-propelled vehicle comprising two local closed circuits, one of which includes the motor armature or armatures and the brake magnet or magnets, and the other of which includes the motor field magnet or magnets, a source of current and variable external resistance.

2. Apparatus for braking an electrically-propelled vehicle comprising a local closed circuit including the motor armature or armatures, a second local closed circuit including the motor field magnet or magnets, a source of current, and means for varying the energizing effect of said second circuit to vary the braking effect.

3. Apparatus for braking an electrically-propelled vehicle comprising a local closed circuit including the motor armature or armatures, a second local closed circuit including the motor field magnet or magnets, a secondary battery, and means for varying the excitation of said field magnet or magnets to vary the braking effect.

In testimony whereof I have hereunto subscribed my name this 17th day of December, 1899.

ERNEST R. HILL.

Witnesses:
JAMES B. YOUNG,
WESLEY G. CARR.